US007480640B1

(12) United States Patent
Elad et al.

(10) Patent No.: US 7,480,640 B1
(45) Date of Patent: Jan. 20, 2009

(54) AUTOMATED METHOD AND SYSTEM FOR GENERATING MODELS FROM DATA

(75) Inventors: Joseph B. Elad, Claymont, DE (US); Apperson H. Johnson, Wilmington, DE (US); Julia E. Cowart, Newark, DE (US); David S. Cleaver, Elkton, MD (US)

(73) Assignee: Quantum Leap Research, Inc., Claymont, DE (US)

( * ) Notice: Subject to any disclaimer, the term of this patent is extended or adjusted under 35 U.S.C. 154(b) by 307 days.

(21) Appl. No.: 11/015,951

(22) Filed: Dec. 16, 2004

Related U.S. Application Data

(60) Provisional application No. 60/530,150, filed on Dec. 16, 2003.

(51) Int. Cl.
*G06F 15/18* (2006.01)
(52) U.S. Cl. .............................. 706/14; 706/15; 706/46
(58) Field of Classification Search ................... 706/14, 706/15, 46; 707/6
See application file for complete search history.

(56) References Cited

U.S. PATENT DOCUMENTS

| | | | | |
|---|---|---|---|---|
| 5,586,218 A | * | 12/1996 | Allen | 706/12 |
| 5,692,107 A | * | 11/1997 | Simoudis et al. | 706/12 |
| 6,324,533 B1 | * | 11/2001 | Agrawal et al. | 707/3 |
| 6,456,991 B1 | | 9/2002 | Srinivasa et al. | |
| 6,513,025 B1 | * | 1/2003 | Rosen | 706/45 |
| 2003/0033263 A1 | * | 2/2003 | Cleary | 706/12 |
| 2003/0212678 A1 | * | 11/2003 | Bloom et al. | 707/6 |

OTHER PUBLICATIONS

Kishan Mehrotra, Elements of Artificial Neural Networks, 1997, MIT, 25,69.*
Trevor Cohn, Performance Metrics for Word Sense Disambiguation, Dec. 2003, Australasian Language Technology Workshop, Dec. 2003, pp. 49-56.*
Ian H. Witten, Eibe Frank, Data Mining: Practical Machine Learning Tools and Techniques with JAVA Implementations. Ch. 8, pp. 280-285 (1999).
Fayyad,U.et al., Knowledge Discovery and Data Mining: Towards a Unifying Framework Proceedings of the 2nd Intn'l Conference on Knowledge Discovery and Data Mining 92-88 (1996).
Rich Caruana, et al., "Ensemble selection from libraries of Models" Twenty-First International Conference on Machine Learning, Article No. 18 (2004).
J. Friedman, et al., "Additive logistic regression: a statistical view of boosting", Dept. of Statistics, Standford University Technical Report, pp. 1-6 (1998).
Baxter, R., Oliver, J., "MDL and MML: similarities and differences", Technical Report TR 207 Department of Computer Science, Monash University, Australia, pp. 1-17 (1994).

(Continued)

*Primary Examiner*—Joseph P Hirl
(74) *Attorney, Agent, or Firm*—Gomez International Patent Office, LLC

(57) ABSTRACT

The present invention relates to a scaleable automatic method of using multiple techniques to generate models and combinations of models from data and prior knowledge. The system provides unprecedented ease of use in that many of the choices of technique and parameters are explored automatically by the system, without burdening the user, and provides scaleable learning over distributed processors to achieve speed and data-handling capacity to satisfy the most demanding requirements.

59 Claims, 6 Drawing Sheets

OTHER PUBLICATIONS

Roweis, S., Ghahramani, Z., "A Unifying Review of Linear Gaussian Models" Neural Computation 11(2) pp. 305-345 (1999).

JSR-73 Expert Group, Hornick, M., "Java™ Specification Request 73: Java Data Mining (JDM) Version 0.96" Java Community process, http://jcp.org pp. 35-71 (2004).

Mackassy, S., Providst, F., "Confidence Bands for ROC Curves: Methods and an Empirical Study" Appears in First Workshop on ROC Analysis in AI, ECAI-2004, Spain, pp. 1-9 (2004).

SAS Institute, Inc. "SAS® Enterprise Miner 5.1" http://www.sas.com/technologies/analytics/datmining/miner/factsheet.pdf. pp. 1-8 (2005).

IBM Corporation "IBM DB2 Data Warehouse Edition:Intelligent Miner" ftp://ftp.software.ibm.com/software/data/pbs/brochures/iminer.pdf, pp. 1-2 (2005).

SPSS Inc. "Clementine® 9.0-Specifications" http://www.spss.com/pdfs/CLM9SPChr.pdf.zip, pp. 1-6 (2004).

* cited by examiner

AUTOMATED METHOD AND SYSTEM FOR GENERATING MODELS FROM DATA

CROSS-REFERENCE TO RELATED APPLICATION

This application claims the benefit of U.S. Provisional Application No. 60/530,150 filed Dec. 16, 2003.

This invention was made with United States Government support under cooperative agreement No. N00014-02-C-0320 with the Office of Naval Research, awarded by the United States Department of Defense, Integrated Biological Warfare Technology Platform (IBWTP). The United States Government has certain rights in the invention.

TECHNICAL FIELD OF THE INVENTION

The present invention, known as the Knowledge Extraction Engine (KEE) relates generally to the field of automated entity, data processing, system control, and data communications, and more specifically to an integrated system for analyzing data, data mining, discovering data relationships, and for the subsequent construction of predictive and descriptive models.

BACKGROUND OF THE INVENTION

The present invention relates generally to the field of automated entity, data processing, system control, and data communications, and uses any number of distinct techniques to provide a an integrated system for analyzing data, discovering likely data relationships, and constructing models based on that data. Specifically, the KEE is a system for automatically learning models from data. The learned models can be used in a variety of ways: They may be used to provide automatic classification of data, based on a given set of classifications from training examples; they may be used to predict numeric values, based on the values from some training set; and they may be used to describe commonalities or functional relationships among the data. In many cases, data mining is used both for prediction and for description. For instance, a regression line is a model of the behavior of a single output to one or more inputs, and can be used both to predict an output, given an input tuple, and to describe the function relating a dependent variable to an abstraction representing all possible tuples of input variables. Thus, the regression technique is appropriate for many model generation goals, including estimation, prediction, characterization, and summarization. Many other techniques share this broad applicability, though some are particularly well suited to one or more prediction tasks, and some are particularly well suited to descriptive tasks.

MOTIVATION

For data mining practitioners, it is becoming more and more difficult to maintain a working knowledge of every relevant technique, and to obtain or create the software implementations of each technique. For the general scientific and business users, this situation is even more difficult. A business user is fortunate if he can use some of the algorithms commonly found in the literature, in open source implementations, or in commercial toolkits. He is rarely confident that he has applied the best method, nor does he typically have a suitable means for adapting the technique to the particular requirements of his task. Not only are individual data mining techniques increasingly obscure, combinations of those techniques often provide better accuracy and robustness than any individual technique. Mastering each technique, and reasonable combinations and adaptations of the techniques, is a daunting task. Available commercial and open source systems typically provide a handful of individual techniques, and may even wrap those techniques with common interfaces, but there is no system prior to the instant invention that automatically attempts to apply the widest useful set of alternative techniques to a given data mining task, and automatically combines the resulting models to provide the best performance with regard to the user's criteria for accuracy or robustness, or simplicity, or meaningfulness of the resulting models.

In many fields, the sheer volume of data precludes the direct application of many data mining techniques, as both the processing time and memory required by these particular techniques grows too quickly with the number of instances that must be considered. There is a need for a general system that can exploit distributed processors to address this volume of data. Additionally, there is a need for a data mining system that can provide anytime over-all behavior, even though it exploits some particular algorithms that lack this quality. Finally, a data mining system should provide deterministic performance for a given set of compute resources. No previous data mining, data analysis, description, and prediction system provides the combination of anytime performance, scalability, deterministic results and generality found in the instant invention.

PRIOR ART

Though the KEE is the first integrated system of its type, there have been several approaches to gaining similar behavior via other technological routes. In the commercial world, several vendors, offer data mining suites, that permit a practitioner to manually select data mining approaches, and to apply them to particular sets of data. Leading examples of this capability include Clementine from SPSS, Enterprise Miner from SAS, and Intelligent Miner from IBM. Non-commercial suites, such as the MLC++ library, developed at Stanford University, and WEKA, from the University of Waikato, in New Zealand, have similar functionality. It should be noted, with respect to the instant invention, that some suites, such as WEKA, feature some methods of combining models, called ensemble-methods, or meta-methods, but, unlike the KEE, they require that the user explicitly choose the identity and parameters of the combined methods, and that the user explicitly choose the identity and parameters of the meta-methods.

Several US patents and applications describe approaches to automate at least some data-mining tasks, for particular data mining goals and types of data. US Application 2003/0212678 to Bloom, et al., describe an "Automated model building and evaluation for data mining system", but lacks the KEE's ability to find the best model, and the best combination of models, found via a combination of different data-mining methods, to satisfy the user's goals. Additionally, Bloom fails to show how more than one processor can be exploited to provide better over-all performance. Finally, Bloom's invention does not produce a stream of ever-better models, as does the KEE.

US Application 2003/0033263 to Cleary describes an "Automated learning system", but that system fails to show how multiple approaches can be automatically combined, to provide a better result. U.S. Pat. No. 5,692,107 to Simoudis describes a "Method for generating predictive models in a computer system", but does not show how combinations of different methods can be automatically combines to find better single or combined models, nor does it show how such a process can be distributed over multiple processors to achieve better over-all performance. Also, in Simoudis, user interaction is required throughout the process, making the system less appropriate for continual online use. U.S. Pat. No. 5,586,218 to Allen describes a "Autonomous learning and reasoning agent", but that invention does not describe the useful combination of different data mining methods, nor how that combination can exploit multiple processors for better over-all performance, nor how deterministic results can be achieved within an asynchronous processing environment. In the academic world, Caruana's lab, at Cornell University is working on a method called "Ensemble Selection" which trains thousands of different models, then combines them in ensembles. Unlike the KEE, this method is not automatic, and does automatically data/model transformations to achieve the broadest application of techniques. Additionally, Caruana's system does not produce a stream of ever-better solutions, and though it permits the selection of various model metrics, it does not offer the user a selection of model goals. Jerome Friedman, at Stanford University, has developed several meta-learning approaches, but has not generalized these systems to fully-automated anytime learning systems, nor has he demonstrated how they can be combined with other learning methods in a scaleable and deterministic way to achieve improved performance over multiple processors. A related industry development, which has been created by a consortium of vendors interested in data mining and the Java platform, is the Java Data Mining specification (JSR 73) which has issued a final version in July, 2004. This document elaborates an industry-standard way to access particular data mining techniques through standard Java interfaces. Such standardization will make an even larger number of data mining techniques available to the user, and to automation systems such as the KEE.

SUMMARY OF THE INVENTION

The present invention integrates several components that are necessary to provide robust, automatic predictive and descriptive model construction, including a method of representing attributes and relations of particular interest to the user; a way of distributing the tasks of model identification, model construction and model tuning over any number of processing nodes; a method of creating one unique model generator per process instance, for any number of process instance running on any number of physical processors, for the benefit of a user or a client process; a way of transmitting user parameters and performance criteria to all model generators, and of acquiring and combining the resulting models; a way of exploiting prior knowledge, when it is available, to direct model construction to prefer (or avoid) the inclusion of previously identified model components; a methodology for matching data attributes to attributes of classes in an ontology and knowledge base of relevant prior knowledge; a technique for improving the performance of an automatic supervised learning system via application of unsupervised learning techniques; a capability of generating stand-alone executable instantiations of the generated models, so that the generated models may be easily integrated into other computer systems, and a method of evaluating compositions of models created by a variety of techniques, to select the best performing models and combinations of models.

The present invention provides in a computer system having a processor, a memory unit, an input device and an output device, a method of automatically inferring one or more models from data comprising computer implemented steps of:

a) using at least one sample set from available data;
b) obtaining one or more goals for the models;
c) obtaining one or more performance criteria for the models;
d) using one or more methods for inferring a model;
e) optionally using one or more parameter choices associated with the methods;
f) rating performance of the models, based on one or more criteria; and
g) constructing weighted combinations of the models with respect to performance criteria.

In a preferred embodiment, the invention provides a method further comprising automatically generating one or more strategies for using multiple learning methods on multiple processors.

In another embodiment, the present invention provides a method further comprising creating a weighted combination of models that exceeds the performance of individual models, by one or more voting approaches selected from the group consisting of: Boosting, bagging, AdaBoost, stacking, arcing, wagging, and Bayesian averaging.

The invention also provides in a computer system having a processor, a memory unit, an input device and an output device, a method for inferring new knowledge in the form of a supported hypotheses, from data comprising the steps of: a) encoding least one model in terms of at least one variable; b) associating the variable with at least one class of items; c) encoding one or more hypotheses as variations to the at least one model, wherein the range of the at least one variable is transformed to a different range; d) associating the at least one variable of the at least one model with at least one information source; and e) selecting at least one tuple from the information source as evidence that supports or refutes the hypotheses.

DETAILED DESCRIPTION OF THE INVENTION

Outline Of The Description

The role of the KEE in the overall process of data mining is described, the design rationale of the KEE is discussed, the importance of creating an automated system of this type and we will walk-through an initial, high-level information flow diagram. Next, we will describe the function and methodology used in the major components of the KEE. Then, we will describe an example domain, and demonstrate how each module participates in the development of models for that domain. We will show how multiple techniques provide different models consistent with the data, how those different models are be generated, in parallel on separate processors, and how those models are combined to create ensembles with better performance than the individual models. We will discuss an example use of the system, followed by a summary of the major technical aspects of the invention.

KEE Role and Design Rationale

Figure 1:
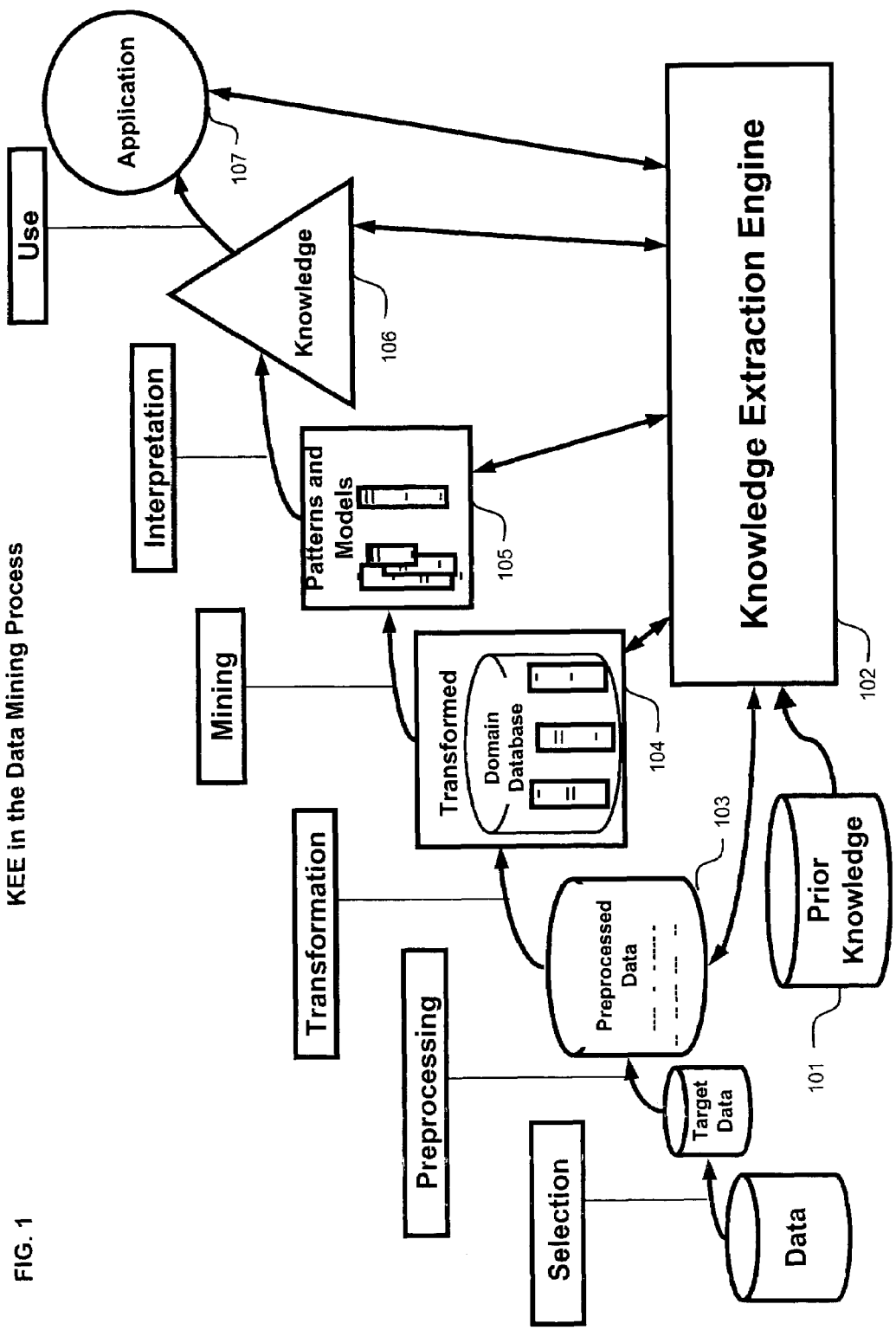
FIG. 1 shows how the invention fits into the over-all process of data mining and knowledge extraction.

FIG. 1. Shows the KEE within the context of the standard data-mining progression, in a process graph based on the one offered by Fayyad, Piatetsky-Shapiro, and Smyth in their 1996 entreaty for a unified Data Mining framework. In addition to the six stages envisioned by those pioneers, we have added a seventh, "Application" Ref. 107, that is the computer-implemented application of at least some of the knowledge culminating in Ref. 105. We have also added Ref. 101, "Prior Knowledge", which may often be exploited to accelerate the model creation process, and which can be used to bias the resulting models so that they fit well with the relationships and nomenclature already available to domain experts. The prior knowledge database consists of an ontology—which is a data baser of concepts and relations, and of particular instances of items in that ontology, and includes an additional mapping of terms from one or more domains to concepts in the ontology. Prior knowledge can be used to introduce either positive or negative bias into the creation of new models from data. In the case of positive bias, concepts and relations from the prior knowledge database are given a higher initial weight than other concepts and relations. For some approaches, such as inductive logic programming, mere inclusion of pre-existing concepts and relations introduces such a bias. In the case of negative bias, the system is directed specifically find new models that do not conform to pre-existing knowledge.

Paraphrasing the Standard Progression Shown in FIG. 1:

Raw data is filtered to just that subset of variables to be considered—the target data.

This subset is cleaned, and erroneous items are often corrected or removed, resulting in preprocessed data.

At this point, often it is often useful to reduce the data by finding proxies for multiple items, variables, or relationships, resulting in transformed data.

Data mining techniques are applied to this transformed data, resulting in models that predict data tuples, or describe patterns among the variables.

Those models and patterns, along with human insight, comprise new knowledge about the relationships existing in the data.

The models may be used directly by some client process, providing a direct application of the new knowledge.

The KEE is most applicable in the stages beyond the preprocessed data stage, and is aimed primarily at the later mining, interpretation, and use stages of the progression, though an allied application of the KEE is to construct models that aid in the selection and preprocessing stages, and, in fact, the application generated in Ref 107 might be used in the preprocessing stage of a subsequent run.

The KEE Automatically Generates Models in Support of the Following Tasks:

Grouping

Classification—assignment of instances into pre-determined classes. The KEE constructs a model that maps tuples from the target data into a set of classes provided as input to the process. Positive and/or negative examples are used both to inform the model building, and to assess the quality of the resulting models. This is an example of supervised learning.

Inherent Grouping—mutual construction of assignment and classes to satisfy some criterion.

The KEE constructs a model that maps tuples from the target data into a set of naturally occurring classes. This is an example of unsupervised learning.

Numeric Estimation, Numeric Approximation, and Numeric Prediction

The KEE constructs models model that predict the numeric value of one or more dependent attribute, based on the value of one or more, independent attributes. This is also an instance of supervised learning. Numeric prediction also applies to special information objects such as audio, image, and video objects.

Characterization/Summarization

A large set of target data is represented or described by a smaller set of identifiers, expressions, or statistics. The KEE seeks models that attempt to provide the optimal summarization of the target data.

Feature selection

This is a kind of characterization where the goal is to find a subset of all attributes or values which are especially important for subsequent data mining tasks.

Relationship Discovery

This is a version of characterization in which the goal is to find patterns, regularities, or (at least partial) dependencies among the attributes.

Hypothesis Generation

This is a version of characterization in which the goal is to generate likely or plausible dependency relationships that can be resolved by additional tests.

Hypothesis Improvement

This is a version of hypothesis generations, in which superior variations of an initial group of dependency relationships are sought.

Discrimination

A model that provides one or more comparisons between particular groups of interest target data is generated.

(Time) Series Analysis

In time series analysis, a particular time attribute or implicit time dimension is considered to have special predictive relevance. For instance, both time of day and time of year may be expected to be significant in predicting temperature, while day of week is less valuable for such a prediction. The KEE views time relationships as a special form of prior-knowledge, with a distinguished variable that is either explicit (the particular time) or implicit (the sequence number of the data) and exploits those likely relationships in constructing predictive or descriptive models.

Forecasting

Forecasting is typically accomplished via numeric prediction or classification, combined with time series analysis.

As shown in FIG. 1, the KEE is particularly concerned with the stages from Preprocessed Data Ref. 103 to Application Ref. 107. Data transformation approaches may, themselves, comprise a major data mining effort, with many potentially useful alternatives existing for most real-world data sets. The KEE aids in this data transformation between Ref. 103 and Ref. 104. The KEE is able to effectively try many transformation alternatives, in parallel, on multiple processors, and to find transformations that are particularly effective for the task at hand. Additionally, the KEE can achieve performance gains by introducing bias from relationships found in the prior knowledge database Ref. 101. Though data transformation, in the form of feature-selection and or data sampling, is often necessary to reduce the sheer quantity of variables or data considered, the KEE system will, as a default behavior, at least attempt to extract models directly from the original, untransformed data—failing to do so only when estimated memory or processor requirements preclude such an approach. Thus, the KEE acts on both the Preprocessed Data Ref. 103 and on the Transformed Data Ref. 104. In some cases, practitioners are interested primarily in the knowledge revealed by relationships and structures that emerge during data mining. In other cases, the parameter values and structure of the model are the main products of the data mining process. One use of the KEE is for insight, which the user derives when the KEE produces particular Patterns and Models Ref. 105, and when it develops statistics and performance data for families of such patterns and models, leading practitioners to new Knowledge Ref. 106. On the other hand, often the goal of data mining is to produce an executable system that exploits the inferred model for some particular application. This step is realized in the Application Ref. 107 stage of the data mining process, which produces executable models, or the source code that can be compiled to create such models, and may be incorporated into other computing systems. The resulting executable models may be incorporated wherever automatic classification, numeric prediction, forecasting, approximation, or hypothesis generation are needed.

Walk-Trough of High-Level Information Flow

Figure 2:
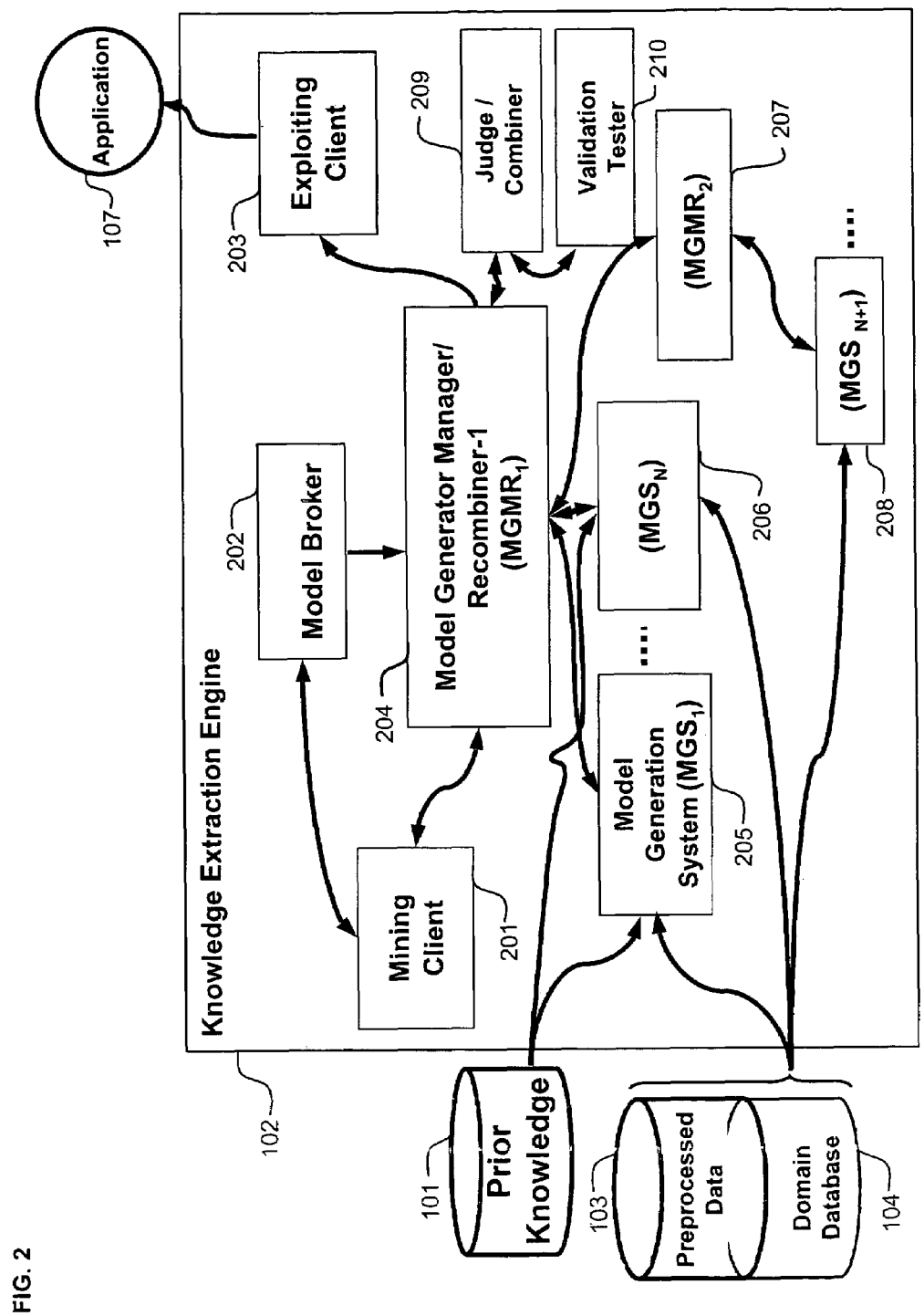
FIG. 2 illustrates the top-level control distributed model generators, in support of a modeling client and an exploiting client.

FIG. 2. shows the information flow, at a high level of abstraction, though the KEE. The process is typically initiated when Mining Client Ref. 201, assigns the Model Broker Ref. 202 some particular Data Mining task. The Mining Client may also provide additional specifications, such as the selection of classification attributes for supervised learning, and may provide specific performance criteria, such as desired weighting in the tradeoff between false negatives and false positives. In some cases, the Mining Client 201 also specifies particular attribute relations to be used as prior knowledge, or lists attributes or relations to be matched, if possible, in the prior knowledge database. Next, the model broker Ref. 202, initializes a Model Generator Manager/Recombiner (MGMR$_1$) Ref. 204, and provides a communication channel between that system and the client process. The MGMR initializes any number of instances of a Model Generation Systems (MGS), as depicted by Ref. 205 and Ref. 206. Each MGS module is given a unique identifier, which controls all of its instance-specific behavior. In a preferred embodiment, this identifier is simply the sequential instance number of the MGS. MGMR instances are likewise given unique identifiers to mandate instance specific behavior on each MGMR node. In order to avoid becoming a communications bottleneck, the MGMR 204 may initiate other instances of MGMR processes, such as MGMR$_2$ Ref. 207, which themselves may initialize any number of MGS processes, such as MGS$_{N+1}$ Ref. 208, running on any number of processors. In alternate embodiments, the MGMR instances and MGS instances may run as separate threads or separate processes of the same physical processor, or may run on any number of distinct physical processors. Communication among all instances of MGMR and MGS is via messaging (e.g. TCP/IP messages or higher level messaging layers such as the Java™ RMI) and the thread or process instances may be distributed over almost any processor system or combination of processor systems, including cluster computers, SMP, MPP, and NUMA computing systems. Each individual MGS obtains goals and sends results to an MGMR process, and has access to any or all of the Prior Knowledge Ref. 101, Preprocessed Data Ref. 103, and Domain Database Ref. 104 systems. The specification of particular variables to consider, mapped as object attributes in the Prior Knowledge database, or as data elements in the Preprocessed Data or Domain Databases, is specified by the Mining Client Ref. 201, and transmitted to the MGS instances through any number of MGMR intermediaries. In some cases, an incomplete specification is given, and the MGS instances must generate the rest of the specification using default strategies, which may exploit relationships given in Prior Knowledge Ref. 101. In a preferred embodiment, this generation of missing specifications is be varied by MGS identifier so that many alternative approaches to filling in the missing specifications are attempted. Each MGS instance works autonomously, and sends a stream of ever-better performing models to its immediate MGMR process, which, in turn, sends the best results it has encountered through any cascade of MGMR nodes, to the topmost node MRMR$_1$ Ref. 204, which communicates a description of the best models found, along with performance data, to the Mining Client Ref. 201. Each MGS and MGMR maintains a queue of the best I individual (base-level) models seen at that level, and a second queue of the best C combinations of those I models, where the size of I and C are specified by the Mining Client 201, or taken from system defaults. Often, the best model for meeting particular performance criteria consists of a combination of base-level models. In fact, the MGS instances may produce such combinations as outputs to the MGMR. The MGMR units may use the MGS-produced combinations directly, or may recombine any combination of models found in the best-model queue, if that combination performs better than any combination in its best-combination queue. To prevent communications overhead, elements from queues are only sent upstream at intervals separated by fixed amounts of MGS computation, so that no intervening MGMR process becomes a communication bottleneck. No process sends a combination model referring to some base-level model that has not yet been sent, and MGMR nodes will discard combination models referring to base-level models that have been dropped from the best-model queue. When user-defined stopping criteria (or system default stopping criteria) are met, the topmost MGMR Ref. 204 sends any remaining models and model combinations to the Mining Client Ref. 201. If specified by the Mining Client, or specified by system defaults, MGMR Ref. 204 also creates an executable version of the best performing base level and combination models, to be used by the exploiting client. The exploiting client integrates the resulting models with existing components and standard data sources to provide capability for the Application Ref. 107.

Scaleability is a major benefit of this architecture, and is achieved by distributing the model finding and model creation task to an arbitrarily large number of MGS processes, which may run any number of physical processors. This invention may be used effectively on symmetric multiprocessing (SMP) systems, massively parallel processor (MPP) systems, cluster computing systems, and wide-area network (WAN) distributed systems, assuming that each system has access to the data repositories. In typical architectures, for this type of system, such scalability is achieved at the expense of deterministic results, i.e. N processors will not always produce the same results, and (N+1) processors will often produce poorer results than N processors. This typical non-deterministic behavior is completely avoided by the KEE scheme of assigning an instance identifier to each MGMR instance and to and MGS instance allows these systems to each explore an arbitrary number of alternative strategies and parameters, but to do so in a deterministic way. The performance of an N+1 processor system will always be at least as good as that of an N processor systems, given the same processors, while the expected average performance of the system increases almost linearly with processors. This scaling is achieved by the fact that the over-all system is, essentially, searching a combinatorially large space, and is, essentially, adding an additional unique high-level searching approach with each additional processor.

Multiple Approaches Oil Separate Processors

Figure 3:
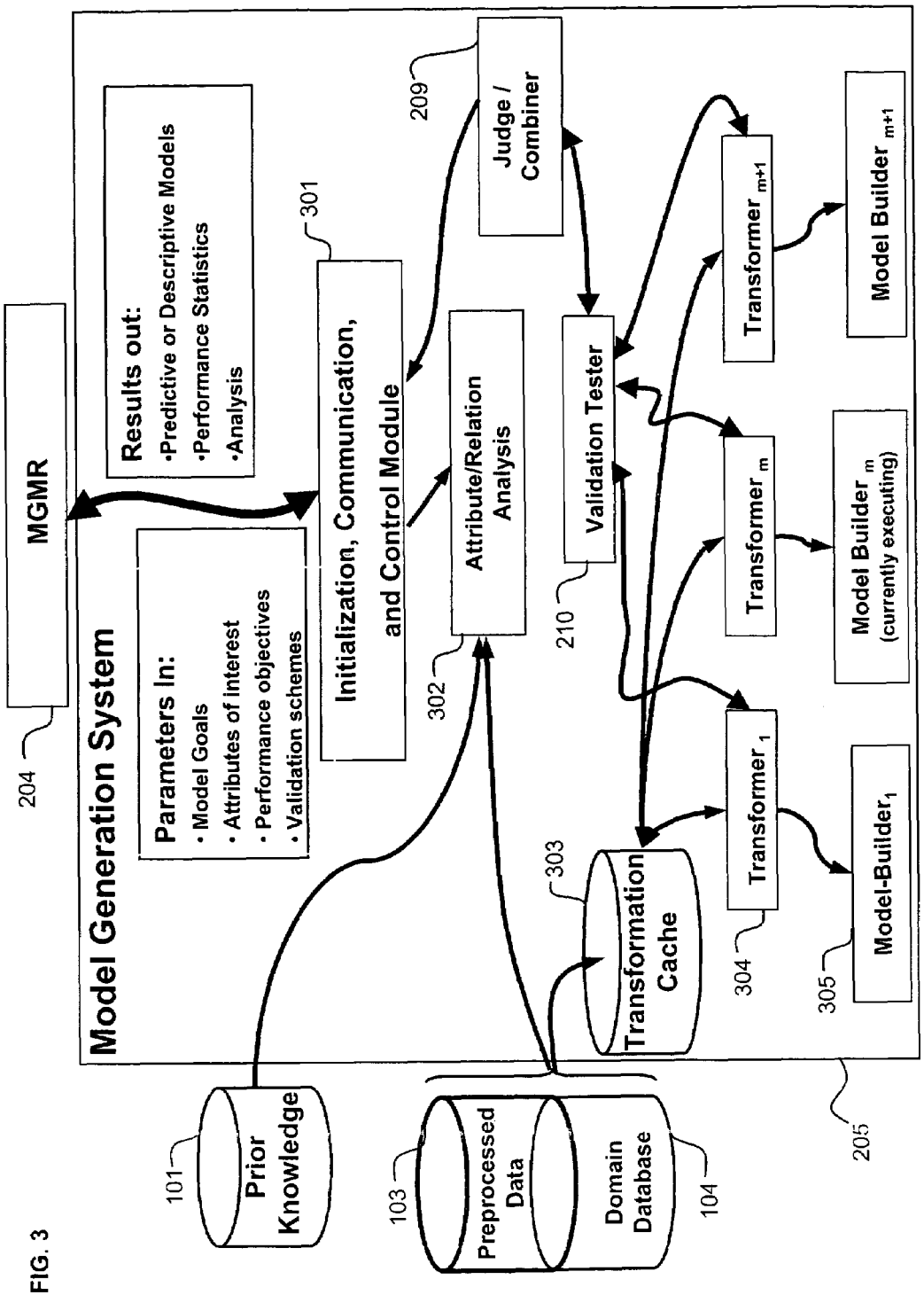
FIG. 3 shows the construction of a single instance of a model generator.

A detailed look at the Model Generation System Ref. 205 is shown in FIG. 3. Each MGS instance has its own Initialization, Communication, and Control Module Ref. 301, which obtains specifications from a MGMR, and uses the instance identifier to generate a unique model generation approach. In a preferred embodiment, many choices within the MGS are made probabilistically, as no single choice is likely to be best for all tasks and data sets. Some of these choices, such schedule of techniques to apply, affect the over-all behavior of an MGS. Other choices set parameters for a single transformation or technique. Every one of the probabilistic choices depends on the instance identifier, and the sequence of choices is unique per MGS instance. When the (directly connected) MGMR 204 sends initialization parameters such as model goals, attributes of interest, (or disinterest), performance objectives, and validation schemes, these are also interpreted in a way that is unique to each MGS instance. For example, the model goals can be any combination drawn from the set of {prediction, forecasting, classification, numeric approximation, numeric estimation, inherent grouping, relationship-discovery, feature selection, discrimination, time-series analysis, hypothesis-generation, and hypothesis-improvement}. These goals, along with identified attributes, and the types of those attributes, help to identify the model creation techniques that are most likely to yield satisfactory results, or fast results, or reliable results. However, the particular order of attempting these techniques is dependent both on the technique and the instance identifier. In a preferred embodiment, the Initialization, Communication, and Control (ICC) Module Ref. 301 of a particular MGS instance may invoke one model generation technique several times before ever attempting another technique, although every technique, whether it is particularly appropriate or not, periodically has an opportunity to be chosen. In another preferred embodiment, to decide which model creation technique to apply, at any given time, the ICC invokes a strategy drawn from the set of {most-appropriate-first, fastest-first, earliest-result-first, most-reliable-first, least-complex-first, due-process, most-recently-successful, and most-historically-successful} where each strategy indicates a preference in selecting techniques in the context of the (provided) data mining goals and the particular data or data attributes. For instance, linear regression is among the techniques chosen for purely numeric data and a goal of numeric prediction by the most most-appropriate-first strategy, by fastest-first, and least-complex-first strategies. On the other hand, techniques which have not been chosen recently, are selected by the due-process strategy, regardless of their appropriateness or speed. Note that several techniques are typically selected by a particular strategy, and that selection among those qualified techniques is made pseudo-probabilistically, given the unique instance identifier of the MGS. In this preferred embodiment, the strategies are represented via a weight vector, which is generated uniquely per MGS instance. In a variation of this preferred embodiment, the weight vector varies adaptively over time, reflecting a combination of successful strategies, and a desire to maintain diverse approaches. In another variation of the preferred embodiment, the system learns an approximate relationship between performance criteria and the strategies or method parameter choices over a period of time, permitting improved selection of strategies and parameters.

Once a particular model generation technique has been selected to run at least one time, the MGS must determine whether data transformation is necessary or desirable. The Attribute/Relation Analysis module Ref. 302 compares the attribute types of the data from either the Preprocessed Data Ref. 103, or the Domain Database Ref. 104, or both, along with the user-selected attributes of interest, to the capabilities of specific data mining techniques. In some cases, again based on probabilistic choice, Ref. 302 also compares the attributes of the data with attributes and relations from the prior knowledge database, to determine which combinations of data attributes might be highly related, thus introducing domain bias in at least some of the transformations. The domain bias may be expressed by applying a-priori weights to model relationships, by filtering out some attributes, or by synthesizing new attributes from combinations of the original input data attributes. This choice of attributes and attribute combinations also varies among MGS instances, and is ultimately controlled probabilistically by the instance identifier. The choice is made any number of times, as slots in the MGS schedule open up. Those slots are open when the MGS is first being initialized, and individual slots open when a particular model building technique terminates. In a preferred embodiment, the number of slots for techniques to run equals the number of different unique techniques that the system may apply to a particular model-building task, but, as mentioned above, this does not mean that each technique will necessarily run in any particular span of time. A particular technique may not have been allocated a slot, because some other technique has already been allocated more than one slot. Note that eventually every technique will be allocated some slots, will be chosen to run, and will get a chance to generate any number of resulting models. In a preferred embodiment, the choice of techniques to run will be biased by 1) the most appropriate technique(s), given the model generation task and the attributes, 2) the best performing techniques, given some history of results in a particular MGS instance, 3) the diversity of techniques attempted so far, and 4) a stream of pseudo random numbers seeded by the instance identifier and used for probabilistic choices. Once a particular transformation scheme is chosen, and a particular model generation scheme is allocated a slot, it may be chosen by the Ref. 301 to be executed for a (limited) round of processing. Each technique is given an iteration hint, telling it how many major iterations are appropriate for a time slot. At the end of the iteration hint, the technique must save its state, if more iterations are necessary, and will yield the CPU back to Ref. 301. Many techniques produce useful intermediate models. In such cases, the technique proposes its intermediate model to the Validation Tester Ref 210, before yielding the CPU.

In many cases, the same transformation may be useful for more than one of the model-generation techniques, or for more than one variation of a particular model-generation technique. For instance, a continuous numeric prediction task can be discretized so that models may be generated via discrete classifiers. There are multiple schemes possible for accomplishing this {linear, logarithmic, polynomial} and multiple choices for the treatment of extreme values. When a particular transformation is chosen (again, via a mixture of most-appropriate and probabilistic choice) the transformation specification and the results of the transformation (up to some data limit set by system defaults or user parameters) are placed in the transformation cache Ref. 303. Because data transformations can be computationally expensive, the contents of this cache are memoized, and the Attribute/Relation Analysis Ref. 302 becomes biased by similar transformations it has recently specified. For instance, both a classification tree generator and Support Vector Machine can use the same initial discretized version of a continuous predicted variable, but the support vector machine technique will require additional transformation to multidimensional 0/1 variables.

Each technique must gauge the amount of processing it must do, as a function of the complexity and number of records to be processed, and act as an iterator, which runs for a particular number of standard cycles, then saves its state so that it can resume processing when it again is allowed to run. In a preferred embodiment, the iterations are scaled to a standard iteration in which the "Apriori" association rule learner processes 500 tuples of random data consisting of 5 attributes, each with 3 possible values, with a minimum support of 0.05% of the data, and a minimum of 90% accuracy. This standard is defined to be 100 units of iteration. In a preferred embodiment, techniques are scaled empirically to this standard, by testing them over a larger variety of inputs, and finding an approximation of the iteration time versus data and attributes, over that set of test cases. Many other approaches might used to relate processor cycles to techniques. Another preferred automatic way to scale the technique iterations is to perform analysis of algorithms over a large set of benchmark problems, determining the variability, and average case runtimes as a function of the attributes and data. The overall behavior of any MGS instance is to provide a platform for both cooperation and competition among techniques. Each technique, sooner or later, gains a share of the CPU. If it can produce a model that belongs on the best-performing models queue, it does so. Because each technique has some autonomy, it can decide to temporarily yield the CPU to others (though not indefinitely), and to change its parameters in response to new information that is visible in the queues of best individual and best-combined models found so far. The high-level strategy used by the MGS guarantees due process (every model-generation technique eventually gets at least a chance to run) while weighting the likelihood of evaluation time toward those techniques that have generated improvements recently. The benefit of a technique contributing an improvement decays via exponential smoothing, with respect to the total MGS accumulated standard iterations. Thus, a technique that contributes early progress, but does not maintain that progress, will give up CPU time to a technique that makes later improvements. The overall behavior of the MGS, then, is to send a stream of improved models to the higher-level MGMR units. This phenomena gives each MGS unit, and each MGMR intermediary anytime model generation behavior, allowing the KEE to serve in applications where a good model is useful as soon as it is encountered, while an optimal model is desired in the long run.

Validation Testing

Figure 4:
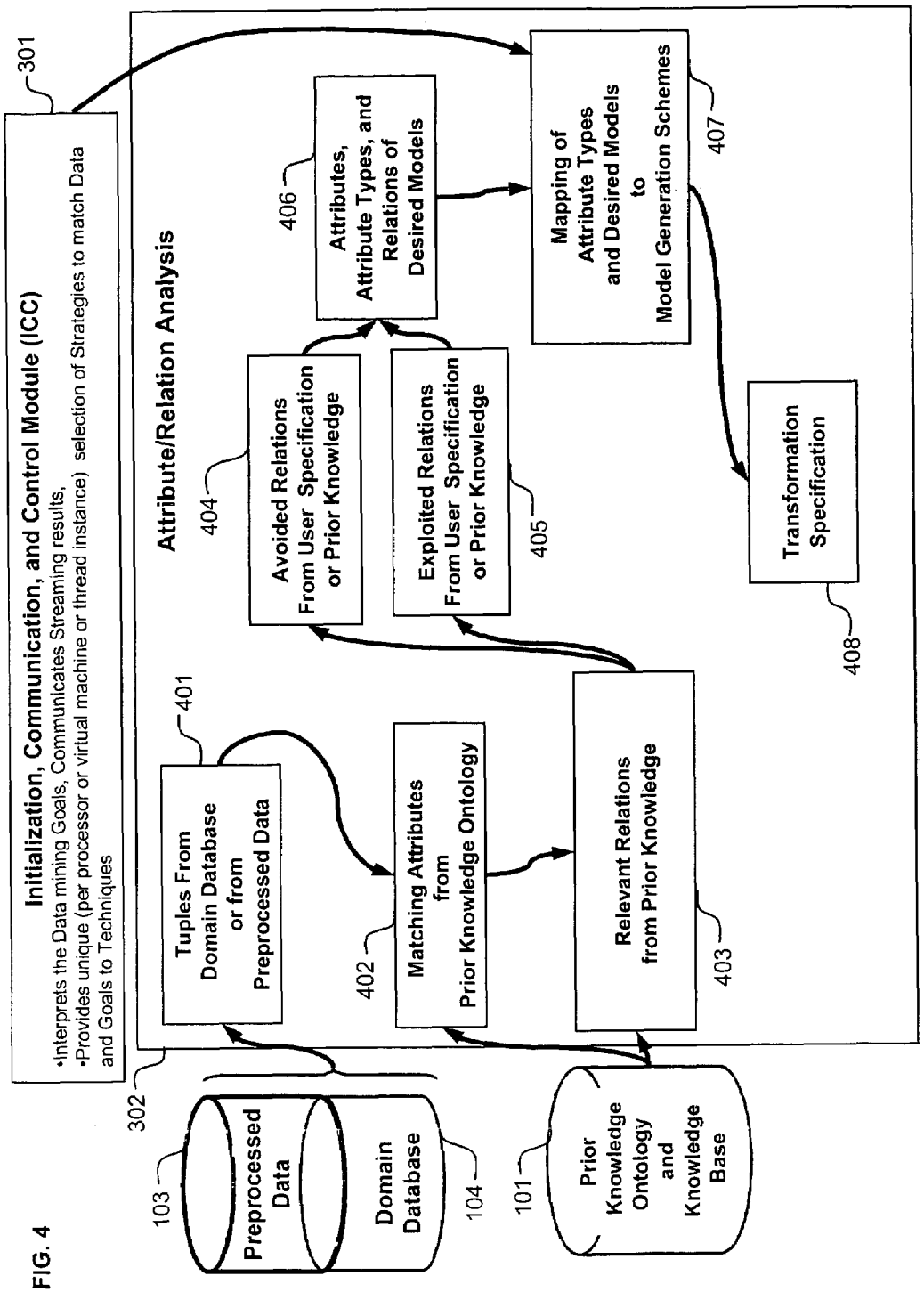
FIG. 4 depicts the Attribute/Relation Analysis module of the model generator.

As individual model building techniques, acting in the Model Builder module Ref. 305 begin to form initial versions of models, those models are proposed to the Validation Tester Ref. 210, which applies a pre-determined testing regime to each of the untested models constructed so far. In a preferred embodiment, the default testing scheme consists of constructing 10 different subsets of the initial data, and evaluating the models over each subset. In cases where the number $\delta$ of data tuples is less than 10 times the number a of actual variables considered, the test set is augmented by ceiling (10 a–$\delta$) additional sets that are chosen via 0.632 bootstrap sampling with the bootstrap samples drawn from the initial $\delta$ data tuples. In some cases, again chosen probabilistically for each MGS instance, up to a/3 additional synthetic vectors are generated via random combination of attribute values from the actual $\delta$ of data tuples. In the case of continuous numeric variables, the random attribute values are chosen uniformly from a range bounded by the minimum and maximum values found in the actual data for the particular attribute. Other validation schemes may be specified by users of the system, including application of a particular test set, and different Building Transformations As mentioned above, the Attribute/Relation Analysis module Ref. 302 considers several bodies of information in constructing a transformation. Referring to FIG. 4., Ref. 401 selects tuples from the Preprocessed Data Ref. 103, or Domain Database Ref. 104, and the attributes of those tuples are matched against attributes of frames in a Prior Knowledge Ontology by Ref. 402. Note that this matching is highly dependent on the semantics of a particular domain, as the Attributes with matching names are considered matches. Next, Ref. 403 selects relevant Relations, Models, and Model Fragments from the Prior Knowledge Ontology and Knowledge Base Ref. 101. For example, a tuple from the domain database may mention Name, Address, and Phone Number, and all three of those attributes may be mentioned by the Ref. 101 Ontology as slots of a frame representing customers. Relations from the ontology make it clear that a Name should be associated with a unique Address and Phone Number, and that more than one Name can share the same Address and Phone Number. These relations can be incorporated as a priori knowledge in models that are generated to predict or classify other attributes of a customer tuple. The relations collected by Ref. 403 are filtered by Ref. 404, which removes relations that are specifically to be avoided in model creation, then augmented by Ref. 405, which adds any relations specifically added via the user specification. Finally, we have collected, in Ref. 406, a list of the Attributes, Attribute Types, and Relations that we seek to exploit in constructing Predictive or Descriptive models. Note that so far, the activities in Ref. 302 can be performed globally, for all MGS instances, and for every model construction technique used by a particular MGS. Thus, in a preferred embodiment, the first instance of Ref. 406 to execute saves the list to a commonly accessible data store, so that other Ref. 302 modules can skip the initialization. Finally, in Ref. 407, some or all of the Attributes, Attribute Types, and Relations from Ref. 406 are selected, based on unique-identifier-driven probabilistic choice, and on the particular strengths of a model building technique, and are used in creation of a transformation specification Ref. 408. Ref. 407 receives information about the model generation technique from the control portion of Ref. 301. The transformation specification provides a method for converting each attribute or set of attributes considered by a particular model-generating technique to a new attribute or set of attributes for which that technique is applicable. The transformation specification also provides the scheme to translate the values of the new attributes back to the original "view" of the model. In a preferred embodiment, the probabilistic choice of subsets of attributes is biased to select attributes that are involved in some particular relation, and has a $1/(1+\ln(\delta))$ chance of selecting all attributes from Ref. 406, where $\delta$ is the number of unique input tuples considered. Note that, in some cases, there are several alternative translations for a set of attributes. For instance, values of categorical attributes may be mapped sequentially to a range of integers, or each value may be mapped to a 0/1 choice in a binary encoding. The first case can directly map any number of values per variable, while the second choice cannot. These encoding choices will be biased by the requirements and strengths of the particular model generation technique chosen, and by the particular attributes to be transformed, but will also depend on probabilistic choice. Finally, the transformation specifications are communicated to specific instances of transformers Ref. 302, each of which is associated with an instance of a model Builder Ref. 305.

Judging, Combining

As models are generated by Model-builder instances, and are measured by the Validation Tester Ref. 210, statistics are sent to an instance of the Judge/Combiner Ref. 209 module, which fills the same role within an MGS instance as it fills within an MGMR module, that is, Ref. 209 examines individual models and combinations of those models, and maintains a ranked list of both the best individually performing models, and the best performing combinations of models. In a preferred embodiment, for the Judge/Combiner module working within an MGS instance, a particular model that is a component of the top ⅓ combinations may be chosen, even if that model is not with the top $Q_i$ individual models, for queue size $Q_i$, this choice, will occur probabilistically, ⅓ of the time that the model "belongs" in the combinations queue, but not in the individuals queue. This choice is never allowed to exclude the top ⅔rds of the best individual models. The queue size for individual models $Q_i$, and for combinations of models, $Q_c$, are typically given as a user parameters, but default to 18 and 6, respectively. Note that it is never the case that a combination includes some individual model that is not in the queue of individual models. This property becomes important as results are propagated back to the client process. When individual models are combined, a separate matrix of weightings is constructed, that specifies how the models are to be combined, for various regions of the ROC curve. Typically, only one or two models apply at any point on the ROC curve, but the Judge/Combiner Ref. 209 system may construct a weighted probabilistic choice combination of any number of particular models, for any span of the ROC curve. The inclusion of extra models takes place when Ref. 209 can reduce the variance of the curve by including several models that are close in performance. In addition to selecting models for individual and joint performance on the ROC curve, users may apply complexity criteria to model selection. This is typically done to increase the (likely) robustness of the resulting models, and as an additional remedy for over-fitting the model to the data. A preferred embodiment uses approximations of Minimum Message Length (MML) as the measure of model (and model combination) and data complexity. Each the MML approximation is constructed as a function of internal variables and states, for each of the model construction techniques included by the Model Builder Ref. 305. In a preferred embodiment, the default selection criteria of the MGS, selection function S is computed as:

$$S=(A\gamma)+(1-\gamma)(M/(1+\ln(\delta))$$

where: A is the area under the ROC curve at the 90% (one-sided) confidence level, M is the approximate Message Length of the model or combination of models, δ is the number of unique input tuples considered, and γ is set to 0.5. The user may change γ to obtain any desired weighting of Area under the ROC curve, versus approximate Message Length complexity measure. It should be noted that user can specify one or more of a wide array of commonly used measures to rank models and model combinations, including: {area under the ROC curve, false positives, false negatives, model complexity, model reliability at a given false positive rate, model reliability at a given false negative rate, accuracy, coverage, precision, recall, F-measure, lift, mean absolute error, and root mean squared error} which are combined by one or more methods selected from the group of: weighting, scaling, complementing, and averaging. The user may additionally specify, rather than the default, one or more of a combination of measures of model complexity, including: bits required for the model representation, bits required for the both model representation and for unexplained data, number of model parameters, size of a graphical representation of the model, number of symbols required in a model encoding, number of branches required in a model encoding, size of an interpretable encoding of the model, size of a compiled encoding of the model}

Figure 5:
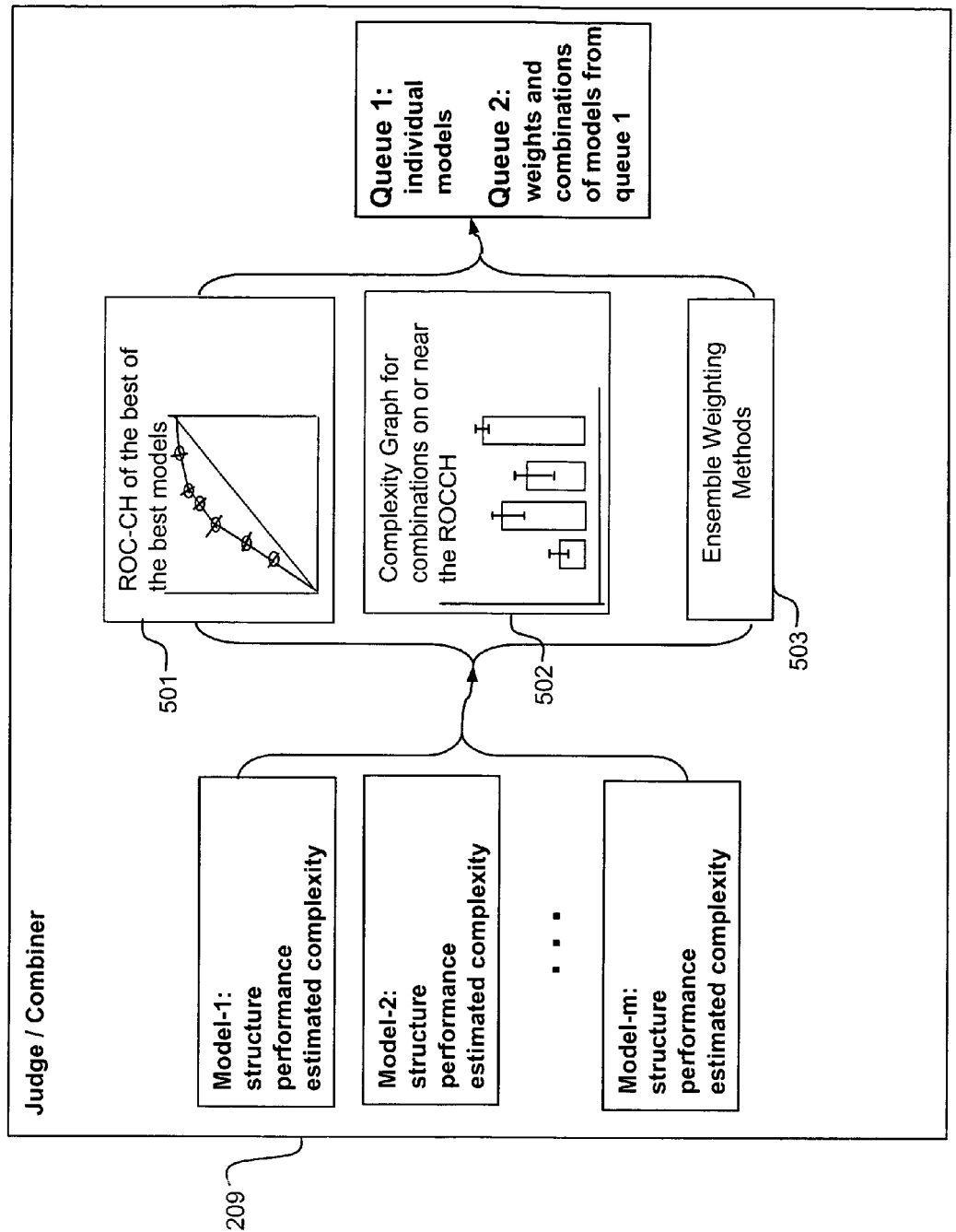
FIG. 5 illustrates the judge/combiner that identifies the best models and best combined models to suit user-specified criteria.

In a preferred embodiment, when module Ref. 209 is used by an MGMR instance, rather than a MGS instance, the individual models in $Q_1$ are strictly the best models encountered so far, and only combinations of those models are included in the queue of combinations of models, $Q_c$. This queue maintenance criterion is different for the MGMR instances, and is required in a preferred embodiment to maintain the deterministic output of the system. The contents of $Q_i$ are a deterministic result of the accumulated processing, thus far, on individual CPUs, and the contents of $Q_c$ depend, deterministically, on those $Q_i$ individual models. The model combinations are evaluated and scored by the Validation Tester Ref. 210. Note, if the MGMR instances used the same queue management as the one employed MGS instances, the deterministic guarantee could not be made, because the contents of $Q_c$ and, consequently, Qi contents would depend on the non-deterministic arrival time of results from MGS instances. The MGMR flavor of Ref. 209 will never discard a superior model from the $Q_i$ queue because it fails to contribute to a top-performing combination of models in the $Q_c$ queue. In an alternative embodiment of the invention, the $Q_i$ and $Q_c$ queues could be maintained in strict ignorance of each other, and only whole combinations (not re-combinations) of methods would be allowed in the $Q_c$ queue. This scheme also produces deterministic results. Yet another preferred embodiment uses a combination of model quality and model diversity to select models for the MGMR $Q_i$, this prevents convergence to a single (or similar) high performing model, with concomitant lack of improvement via combination. Regarding FIG. 5, performance statistics and model complexity estimates are accumulated for each model generated. These statistics determine whether the model belongs in the queue of $Q_i$, individual models. A newly entered model is also "test-combined" with the other models currently queued, via the Ensemble Weighting Methods Ref. 503. In a preferred embodiment, the specific Ensemble Weighting Methods is chosen probabilistically from a set consisting of: {boosting, bagging, AdaBoost, stacking, arcing, wagging, and Bayesian averaging).

As mentioned above, both the area under the ROC curve Ref. 501 and the model complexity Ref. 502 are considered in selecting either individual models or combinations of models for the queues.

Model Building

Figure 6:
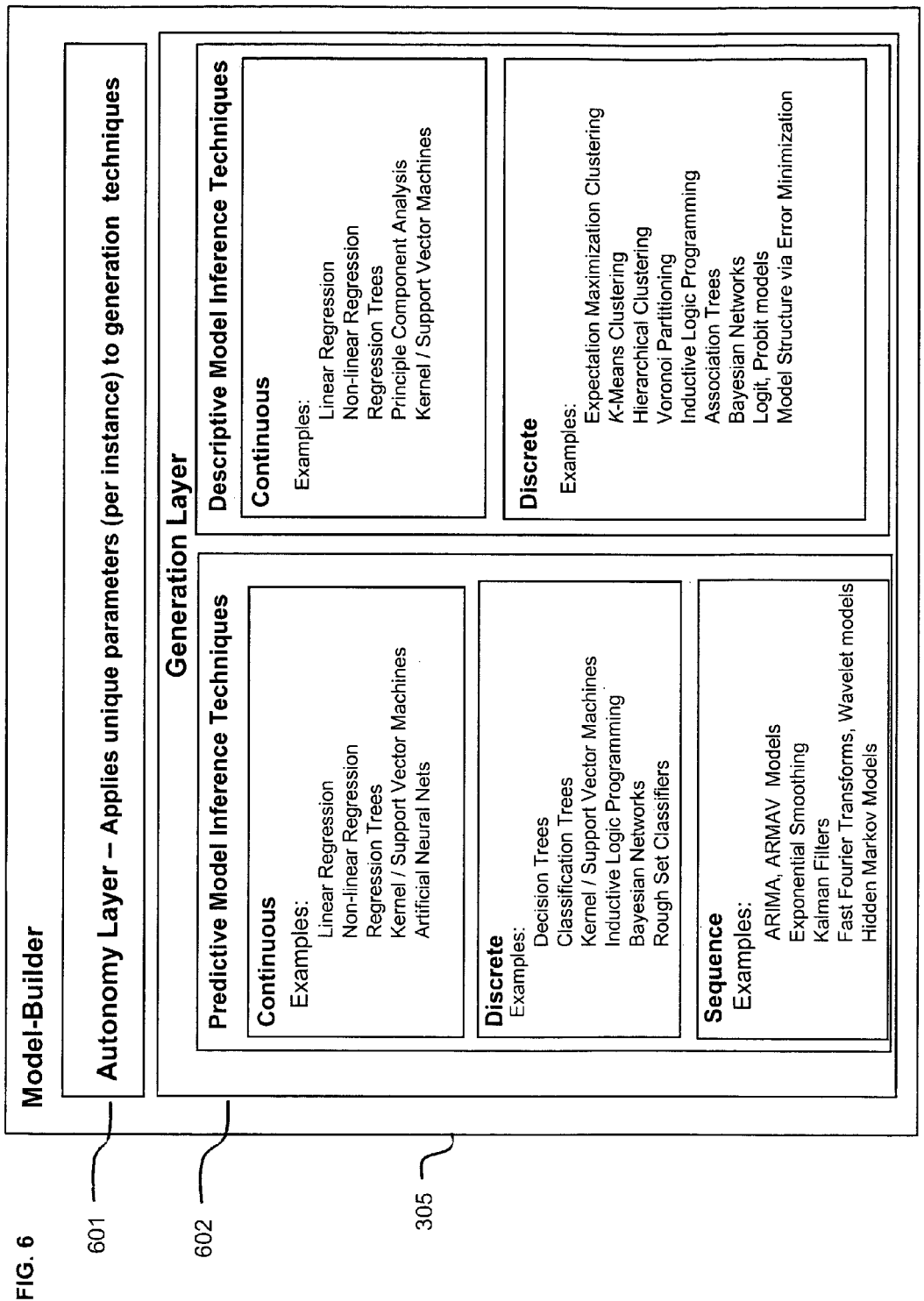
FIG. 6 shows the important elements of the model builder, along with representative component methods that apply directly to various model generation tasks.

FIG. 6. shows the Model Builder, Ref. 305 in more detail. The Autonomy Layer Ref. 601 allows a model-building instance to keep running with the same initial parameters, to change parameters, or to terminate its instantiation and give up its run-slot. Each Ref. 305 module can obtain performance information about the best results posted so far. In some cases, the presence of existing good models in the queues will cause Ref. 601 to give up its slot temporarily, because the likelihood of improving on those results is very small, given its recent progress, or it may change parameters that affect its potential position on the ROC curve, or the approximate complexity of the models it creates. Like most other choices in the system, these choices are made probabilistically, in a way that depends uniquely on the instance identifier. The Generation Layer Ref. 602 can instantiate any of the model generation techniques listed. Note that there is a rough dichotomy of Model techniques on the Predictive v. Descriptive dimension, but that all predictive techniques are at least somewhat descriptive. Additionally, descriptive techniques may be often be used in predictive applications. As an example of a technique that is both predictive and descriptive, consider Support Vector Machine techniques. They construct boundaries that partition cases into positive and negative examples and these boundaries can be used predicatively, to classify new tuples. On the other hand, the process of creating partitions between classes also identifies the set of variables that support that partitioning (typically a small subset of the variables)—and those variables present both a compact description of the classification scheme, and can sometimes identify anomalous data items. It should be noted that, many, many additional model construction techniques are available in industrial and research implementations. The architecture of the KEE allows easy integration of any new technique into the system, and the inventors contemplate frequent updates to the set of techniques in Ref. 602. The criterion for inclusion of a new technique is that it either strictly dominates at least one existing technique over a large set of diverse benchmarks (which are used for all KEE testing and performance evaluation) or it provides a net improvement of at least 5% via the default performance criteria, when averaged over the benchmarks.

In a preferred embodiment, the KEE uses the Self-organizing maps, Voronoi diagrams, competitive learning, clustering by expectation, minimization, k-means clustering, k-medoids clustering, incremental conceptual clustering, farthest-first techniques, agglomerative nesting, divisive analysis, latent semantic indexing, robust clustering using links, density-based clustering, multi-resolution grid clustering, wavelet clustering, and Bayesian analysis clustering, distance-based outlier detection, and deviation-based outlier detection for the goal of partitioning data into natural groupings.

Also, in a preferred embodiment, it also uses linear regression, non-linear regression, Logit regression, Probit regression, regression tree approaches, Bayesian influence networks, artificial neural networks, the Apriori algorithm, the direct hashing and pruning algorithm, the dynamic itemset counting algorithm, hypergraph partitioning algorithms, prefix-projected sequential pattern mining, vertical-layout algorithms, vertical itemset partitioning algorithms, all-dimensions-tree approaches, frequent-pattern tree approaches, rough-set classifiers, generalization-tree approaches, Peano count tree approaches, constrained association rule approaches, and principal component analysis for the goal of learning patterns and relationships from data.

Also, in a preferred embodiment, the KEE uses inferred rules, support vector machines, Chi-square automatic interaction detection, ID3, C4.5, C5.0, one-R, zero-R, the Apriori algorithm, support vector machines, kernel methods, radial basis functions, inductive logic programming, artificial neural networks, error minimization via robust optimization, hidden-Markov models, hierarchical learning, k-means learning, principal component analysis boosting, bagging, AdaBoost, stacking, arcing, wagging, reinforcement learning, unsupervised learning, time-series learning, exponential smoothing, fast Fourier transform, Kalman filtering, wavelets, auto-regressive integrated moving averages, generalized autoregressive conditional heteroskedastic methods, and dynamic time-warping methods to infer classification and prediction models.

Additionally, the KEE can use simulation as an oracle to determine whether a particular model provides a good representation of some phenomena, which is especially useful for complex systems that have no known closed-form representation.

It should be obvious that there are many alternative embodiments of the instant invention that use a different set of model generation techniques, and that the set of techniques used by a preferred embodiment is expected to evolve as new model-generation techniques become available.

Example Domain and Task

For the rest of the discussion, we will consider an example domain of event descriptions drawn from an online newspaper, and the task of estimating the number of people attending each event. An example of the event description text is given below:

Sunday, Sep. 21, 2002, 10:30 a.m. registration, 11:30 a.m. walk

Walk for the Animals

Benefits Delaware Humane Association Banning Park, Wilmington

Admission: $20, ages 6-16 $5, 5 and younger free

For information: 571-8172, Ext. 301, or dehumane. org

On the surface, this is a straightforward numeric prediction task, but there are many applicable techniques. Since no population estimate is included in any of the data items, the user (via the client process) will need to provide those estimates for at least some description instances. Alternatively, the user may prefer categories of event attendance population {1-49}, {50-199}, {200-799}, etc. rather than a single-valued prediction.

Since many alternative data-mining methods might be successful in constructing these models, and since there are many parameter choices to be specified with each technique, an automatic system needs to make these decisions in a non-committal way, so that the wrong choice of method or parameter does not prevent the success of the entire system. The KEE constructs a unique schedule of methods and parameters to act on a given data set, for each separate process (which is running on either a separate physical machine or a separate virtual machine). The schedule selects a series of particular data mining methods, and associated parameters, and applies those methods incrementally, to produce better and better (alternative) models. The methods register themselves with the scheduler, and specify the conditions under which they are particularly well suited. For instance, decision stump methods provide quick, robust models, but typically do not provide as much accuracy as slower, more sophisticated methods, the schedule itself uses probabilistic choice to select a series of strategies, which, in turn, use probabilistic choice to select a sequence of methods and parameters to apply. Once a method is chosen, it runs to completion, (producing a model) or saves its state until it is called again. The methods themselves are wrapped with an "autonomy layer"—which allows them to probabilistically choose between extending their current model creation activity, and starting again, with different parameters. One of the reasons that a method might choose the latter course is that the autonomy layer can query statistics about other models created so far by the same MGS. If the other models have better statistics than the current method is likely to produce, given its own statistics, it may probabilistically choose to modify some of its tunable parameters.

For our example application, the first strategy chosen, for machine 1, is to apply the most direct method applicable, i.e. the one that requires the least transformation. For the population prediction problem, some of the direct methods include: Linear Regression—creating a vector of word frequencies in the training text, and regressing the numeric population values with respect to those frequencies, and Artificial Neural Network (ANN) function induction—creating a neural net that learns the mapping between word vector counts and population values. Neither of these methods, acting on the default, un-translated data, is particularly effective for this domain. Some of the probabilistic parameter choices, made at the invocation of the method or invocation of the translator, improve their performance. For instance, tokens matching those lexical items that map to concepts in an existing ontology of types of events form a smaller, more useful vector than the original one. Alternatively, those concept matches are substituted for the original tokens. Also, the average absolute or relative location of words or tokens is recorded in a second vector, to provide more specificity than the "word bag" approach. Another alternative would consider n-tuples of terms, rather than single words or tokens. Each of these alternative transformations will eventually be explored, in different sequences, with different tuning parameters on the various particular MGS instances. All of the probabilistic choices are made by querying a stream of numbers generated via a pseudo-random number generator, which has a different initial seed for each machine. Thus the choices for an MGS running on machine m are completely determined by m, and independent of the choices made on other MGS instances. Also, because the best results from a set of machines is funneled upward by the MGMR modules, the results of running on n+1 machines will always be as good or better than the results from running n machines, given equivalent processing power.

Performance Criteria.

By default, for comparison of predictive models, the system seeks combinations of models that maximize the area under the Receiver Operating Characteristic curve, which is averaged for the n-fold cross-validation test set. This provides a metric that balances precision and recall through a large range of possible model uses. The user may specify error penalties for the entire curve, or for particular regions of interest of the ROC curve, if curve variance in those regions is particularly important to the user's application. Where multiple classifications are sought, the KEE constructs a composite curve, first constructing individual curves of each class and its complement. For numeric prediction domains, the system default criterion maximizes the correlation coefficient for the predicted values versus actual values in the n-fold cross-validation tests. Other performance measures available to the user include root mean-squared error, root-relative squared error, and relative absolute error.

Performance measures for data mining via unsupervised learning are more problematic. Typically, the performance measure is part of the method that learns natural groupings by optimizing with respect to that measure. As a result, each unsupervised method is likely to do well by its own criteria, and there is a lack of accepted performance criteria beyond those embedded in the various methods. In many techniques, choice of the number of groupings k is typically made beforehand, and error is minimized, given this initial choice. In a preferred embodiment of invention, when no user preference of k is specified, the KEE constructs n-fold cross-validation test sets, and rates particular generated k cluster models with respect to the internal consistency of their clusters over the test set. Each k clustering is created from a ½ data training set, consisting of M items, then repeatedly, half of that data is mixed with ½ from the holdout set, and a new, mixed k-clustering is created. For each pair of assignments that clustered together the original ½ training set, if they are not assigned to the same cluster in the mixed k-clustering, the original k-clustering is assessed a penalty of 1. For each pair of assignments to different clusters in the original ½ training set, if they are now assigned to the same cluster in the mixed k-clustering, the original k-clustering is assessed a penalty of 2. Now, the k-clustering, for $k \geqq 2$, is chosen that to produce the smallest summed penalty. If a clustering were perfectly consistent, the penalty would be zero. In cases where prior knowledge, in the form of predefined categories is available, a variant embodiment of the KEE uses Strehl's normalized mutual information-based quality criterion to find the best k. Other schemes, such as Smyth's Monte Carlo Cross-Validated Clustering (MCCVC) approach, may be used in an alternative embodiment. Note that the default strategy works for all grouping strategies, including clustering, partitioning, etc. In the case of both supervised and unsupervised model building, at least one classifier is technique is evaluated on the basis of Minimum Message Length, and the robustness of that classifier over the n-fold training set is used to estimate the robustness performance of other classifiers.

When combining models automatically, a preferred embodiment uses, as a default performance objective, the maximization of the area under the 90% confidence interval around the ROC curve; with that interval radial sweep methods, and the area under the ROC curve approximated via Romberg integration. Users may opt to change the performance criteria, for instance, and specify optimal performance just at a particular region of the ROC curve. For instance, in constructing a detector of highly contagious highly fatal diseases, such as Smallpox, a practitioner may permit a high percentage of false positives to achieve a very low percentage of false negatives. On the other hand, for detection of a relatively benign disease, which is cured via expensive or painful treatments, he may prefer models that produce a larger percentage of false negatives, but rarely a false positive. Additionally, the user may specify an expected repeatability target, in terms of a confidence interval around the performance ROC curve in the selected performance region. That is, he may prefer a model that has poorer average behavior, but low variance, over one that has better average behavior, but is less consistent over expected data. In a preferred embodiment, the user may also specify particular performance testing regimes, such as N-fold cross-validation, or allow this testing criteria to be determined automatically by the system, given the users stated performance criteria.

User-Specified Prior Knowledge

Users (or other software systems) may specify particular known relationships to exploit or ignore, either via direct reference, or indirectly, by reference to objects or object/attribute pairs in the Prior Knowledge database Ref. 101. Typically, prior knowledge will be exploited where it might help to produce better performing models or ones whose structure and description closely matches some given domain ontology. On the other hand, the user may specify particular relationships that should not be exploited, because they are likely to be misleading, or because his goal is to find a model that does not assume the knowledge of those particular relationships. For instance, hospital stay might be a good predictor of disease severity, but is not useful in a model aimed at predicting disease severity at the time of hospital admission—so the length-of-stay relationship between a patient and a hospital may be deliberately excluded from the models constructed for this purpose.

Transformation

In the example domain, the user may specify particular classes, attributes and relations from a domain ontology, such as sponsoring organization, location, address, telephone number, and activity as particularly important for prediction. In fact, given a prior knowledge database; it is possible to infer the value of some of these attributes from others. Additionally, the user may specify numeric predictions with respect to particular values, such as NASCAR=>100,000, or High School=>500. He may also specify that these particular predictions should be weighted with respect to each other, and relative to predictions made by MGS instances. In a preferred embodiment, the default treatment is to weight all user-specified predictions equally, and use the average weightings to combine those predictions, when more than a single user-prediction matches the data. Also, in the default case, the KEE combines as much or as little of the user-defined prediction as is necessary to achieve the best scores on performance criteria—this allows the system to exploit user-supplied knowledge if it is useful, but to discard it when it is misleading. Ultimately, all user choices, and system-supplied defaults are communicated down to the particular MGS instances that will generate particular models. Note that there is no direct way to determine matches for classes, attributes and relations in the raw text of the example, but we this information becomes useful in translating the data-mining task.

As noted before, that there is no direct way to determine matches for classes, attributes and relations for a raw text document, so the KEE chooses and combines techniques from a large palate of transformations, including:

Removal of stopwords—which add little meaning, may be removed from the text,

Application of stemming—to find the root words, which may be compared with lexical entries, Invocation of general natural language parsers, to transform words into syntax trees, with assignments of words to grammatical types, Invocation of domain-specific parsers for special idioms, Invocation of component parsers for recognizable text components such as dates addresses, and phone numbers, Invocation of parsers with additional domain-specific semantic constraints, Combination of parser invocations, to obtain consensus assignments, Mapping of words and word types from syntax trees to lexical items, Lexical entries matching a word may be mapped to senses in a dictionary or thesaurus, Senses of a word may be mapped to concepts and attributes in some ontology, Strings or patterns treated as single units, via sliding window recognizers or regular expression matchers, Weighting by term frequency (from the immediate text, or from some larger body of text) may be used to weight term relevance, and Weighting by domain-specific terms.

These transformations are facilitated by lexicons, such as Wordnet, and mappings, such as the mapping between Wordnet terms to the Suggested Upper Merged Ontology (SUMO), as well as the availability of high-performance natural language parsers, such as the XTAG parser and the Alembic Workbench Environment for Natural Language Engineering.

Other transformations, more general than those described above, may be applied to data after it has been converted or mapped to particular named categories: For instance:

Multiple categories are transformed to sequences of zero-one categories,

Nominal categories are transformed to numeric categories via counts of states,

Nominal categories are clustered together to produce as smaller set of items to be considered in the model-building schemes, Discrete numeric attributes are coded as a series of zero-one attributes, Discrete numeric attributes are treated as multiple nominal categories, Discrete numeric attributes are treated as continuous numeric values, Continuous numeric values are rounded or truncated to be treated as discrete numeric attributes, Continuous numeric attributes are bucketed into discrete categories, Continuous numeric attributes are transformed by linear, logarithmic, exponential, and arbitrary polynomial functions.

Instantiation as a constant,

Reduction in range,

Mapping to a different range via numeric transformation,

Mapping to a different categorical range,

Mapping from a categorical variable range to an integer,

Mapping from an integer range into multiple binary ranges,

Mapping from a continuous numeric variable into discrete ranges,

Mapping from discrete ranges into categorical variables,

Normalizing, logarithmic transformation,

Rounding to some number of fractional digits,

Rounding to some number of significant figures,

Linear transformations,

Polynomial transformations, and

Rational transformations.

Knowledge and Application

Referring back to FIG. 1, two products of the KEE Ref. 102 are Knowledge Ref. 106 and Application REF 107. In the case of our population predictor, finding the best model for predicting population contributes new knowledge about Events, Event Descriptions, and about local social and entertainment venues. For instance, a rule induction technique creates a descriptive model that says that social events with population>10,000 never occur at High Schools. This knowledge helps planners to pre-position the right emergency service resources at high school events. Each model produced by the KEE has an associated description that explains the techniques employed and permits review of the stages of transformation applied to the initial data. At the same time, the best model or combined ensemble of models may be applied directly by some special purpose system, such as an emergency dispatcher that must send the right resources to an event location. Note that knowledge is simply a believed model of some phenomena. After the KEE has identified such a model, and reasonable support for it has been found, it can be used in a variety of ways, and can be related, through the use of domain ontologies, to larger bodies of knowledge, statements in predicate logic, representations of theory, and human endeavors such as scientific research, collaborative engineering, biomedical and pharmaceutical discovery, and education. In a preferred embodiment, the instant invention can be combined with a data visualization system, such as those sold by Visual Numerics, or to open source data visualization schemes, to provide users with an interactive environment for exploration of data, models, hypotheses, and knowledge.

Another use of the KEE system is to produce new hypotheses which can be verified and included in a growing portfolio of knowledge. This portfolio can be represented as a conceptual network of nodes and arcs, with dependency, class membership, and similar relationships depicted by labels on those nodes and arcs. Because the KEE can learn new models relating to this network, it can be used to grow the effective coverage of the network. Labels in the network can also represent variables, causes, intentions, beliefs, aims, behaviors, and reifications of the nodes or arcs, inputs, outputs, belief calculus, provenance rules, cost and range of applicability, credibility, ownership, and access authorization.

The hypotheses mentioned above are particular model instances that are found to be credible, and they are related to each other through the relationships represented in domain ontologies. The evolution of such hypotheses can be used to drive automatic experimentation. They can also be used to explore intelligence data, to find indicators of adversarial actions and plans, and can be used to explore biomedical data, to elucidate the mechanisms of disease and suggest effective therapies.

Additionally, an executable version of those models, along with any required instance data, is generated so that stand-alone applications may use the generated models, and so that those models may be incorporated into other software systems, such as servers, data filters, and alert generators. In some cases, such as instance-based learning approaches, most of the generated model is actually data, and may be generated in the form of either tables or executable code. In every case, the generated executable model is far less code and infrastructure than the entire KEE system, and is generated optionally as source code, or libraries, or both. In the case of libraries, the user must have an appropriate compiler available. For model implementations that can be executed on parallel processors, the KEE generates an executable that can be run in parallel, among any number of processors, relying again on the instance identifier scheme mentioned previously, to distinguish between running instances. In a preferred embodiment, model code can be generated in either C++ or Java, though source code or object code in any target language, including any general purpose language and any computing language aimed at a particular computer architecture, could be easily produced.

SUMMARY

We have shown how multiple model building techniques can be used in cooperation and competition to find the best performing models and combinations of models for both the development of new knowledge, and for incorporation into applications that use the descriptive or predictive capabilities of those models and combinations of models. We have shown how this process can be distributed over any number of processors to produce results more quickly, or to produce better performing results, and to produce results in an anytime fashion. We have shown how this system can produce deterministic results, per set of compute resources, even though many probabilistic choices are made in exploring the model space. We have shown how the system can be easily extended to incorporate new model generation techniques. We have demonstrated how the system architecture supports automatic use of prior knowledge and multiple data transformation approaches, to permit a wide array of model generation techniques to be applicable to a given model generation task.

We claim:

1. In a computer system having at least one processor, at least one memory unit, an input device and an output device, a method of automatically constructing computer representations of a plurality of models from data and providing those constructed computer representations as models of physical phenomena or of commercially significant phenomena in memory for making predictions or for revealing previously unknown data relationships and for use by a human or use by a computer acting on behalf of one or more humans wherein the use is a basis for decision-making, comprising computer implemented steps of:
    a) using at least one sample set from available data;
    b) obtaining one or more goals for the models from a human or from a computer acting on behalf of one or more humans;
    c) obtaining ROC convex hull performance criteria for the models, wherein the performance criteria select models to satisfy the one or more goals;
    d) using a plurality of parameter choices associated with the methods;
    e) using a plurality of methods, and a plurality of parameter choices, for inferring a plurality of models;
    f) rating performance of the inferred models, based on one or more criteria; and
    g) constructing and evaluating weighted combinations of the inferred models with respect to the performance criteria.

2. The method of claim 1, wherein the goals for the models are one or more selected from the group consisting of:
    prediction, forecasting, classification, numeric approximation, numeric estimation, inherent grouping, relationship-discovery, feature selection, discrimination, time-series analysis, hypothesis-generation, and hypothesis-improvement.

3. The method of claim 2 further comprising finding one or more models via the computer implemented steps of:
    a) using one or more learning methods, running on one or more processors;
    b) communicating the one or more models by messages over network or by an inter-process communication channel among the one or more processors; and
    c) selecting the models or the combination of models that are best ranked, given the specified goals and the specified performance criteria, from the one or more models communicated among the one or more processors.

4. The method of claim 2, further comprising automatically generating one or more strategies for using multiple learning methods on multiple processors.

5. The Method of claim 4, further comprising deriving or approximating at least one measure of complexity for each of the one or more models, in terms of model representation or model encoding, the measure consisting of at least one selected from the group consisting of:
    bits required for the model representation, bits required for both the model representation and for unexplained data, number of model parameters, size of a graphical representation of the model, number of symbols required in a model encoding, number of branches required in a model encoding, size of an interpretable encoding of the model, and the size of a compiled encoding of the model.

6. The Method of claim 5, wherein the one or more strategies are selected from a group consisting of:
    most-appropriate-first, fastest-first, earliest-result-first, most-reliable-first, least-complex-first, due-process, most-recently-successful, and most-historically-successful.

7. The Method of claim 6, further comprising using a vector of weights for dictating the combination of strategies.

8. The Method of claim 7, further comprising varying the vector of weights over time for responding to new data, or for responding to a different area of search space, where the search space is defined as the space of potential models.

9. The Method of claim 7, further comprising using a unique identifier for each instance of a model inference system, thereby dictating a unique selection of strategies for that processor, so that each instance of the one or more learning methods is using a unique over-all strategy.

10. The Method of claim 9, further comprising creating a weighted combination of models that exceeds the performance of individual models, by one or more voting approaches selected from the group consisting of:
    boosting, bagging, AdaBoost, stacking, arcing, wagging, and Bayesian averaging.

11. The Method of claim 10, further comprising communicating a queue of one or more individual models to a hierarchy of at least one model combiner.

12. The Method of claim 11, further comprising communicating a queue of one more combinations of models to a hierarchy of at least one model combiner.

13. The Method of claim 10 wherein the rating performance includes one or more criterion selected from the group consisting of:
    area under the ROC curve, false positives, false negatives, model complexity, model reliability at a given false positive rate, model reliability at a given false negative rate, accuracy, coverage, precision, recall, F-measure, lift, mean absolute error, and root mean squared error;
    wherein the criterion are combined by one or more functions selected from the group of:
    weighting, scaling, complementing, and averaging to achieve a combined performance criterion.

14. The Method of claim 10, further comprising dividing the data into natural classifications by one or more methods selected from the group consisting of:
    Self-organizing maps, Voronoi diagrams, competitive learning, clustering by expectation, minimization, k-means clustering, k-medoids clustering, incremental conceptual clustering, farthest-first techniques, agglomerative nesting, divisive analysis, latent semantic indexing, robust clustering using links, density-based clustering, multi-resolution grid clustering, wavelet clustering, and Bayesian analysis clustering, distance-based outlier detection, and deviation-based outlier detection.

15. The Method of claim 10, further comprising inferring data relationships by one or more methods selected from the group consisting of:
    linear regression, non-linear regression, Logit regression, Probit regression, regression tree approaches, Bayesian influence networks, artificial neural networks, the Apriori algorithm, the direct hashing and pruning algorithm, the dynamic itemset counting algorithm, hypergraph partitioning algorithms, prefix-projected sequential pattern mining, vertical-layout algorithms, vertical itemset partitioning algorithms, all-dimensions-tree approaches, frequent-pattern tree approaches, rough-set classifiers, generalization-tree approaches, Peano count tree approaches, constrained association rule approaches, and principal component analysis.

16. The Method of claim 10, further comprising constructing classification or approximation models by one or more methods selected from the group consisting of:
    inferred rules, support vector machines, Chi-square automatic interaction detection, ID3, C4.5, C5.0, one-R, zero-R, the Apriori algorithm, support vector machines, kernel methods, radial basis functions, inductive logic programming, artificial neural networks, error minimization via robust optimization, hidden-Markov models, hierarchical learning, k-means learning, principal component analysis boosting, bagging, AdaBoost, stacking, arcing, wagging, reinforcement learning, unsupervised learning, time-series learning, exponential smoothing, fast Fourier transform, Kalman filtering, wavelets, autoregressive integrated moving averages, generalized autoregressive conditional heteroskedastic methods, and dynamic time-warping methods.

17. The Method of claim 10, further comprising using a simulation as at least one model inference method.

18. The Method of claim 10, further comprising providing system control by the computer implemented steps of:
    a) adding a user interface;
    b) supporting navigation of existing model relationships and construction and addition of at least one new model; and
    c) graphically depicting at least one characteristic of least one a model.

19. The Method of claim 10, further comprising exploiting prior knowledge, encoded as at least one relationship between attributes of the model, to efficiently extract new knowledge from data.

20. The Method of claim 10, further comprising automatically generating at least one hypothesis.

21. The Method of claim 6, or 10, further comprising determining the reliability of an information source associated with the sample set by comparing two or more inferred models with respect to the performance criteria.

22. The Method of claim 6, or 10, further comprising maintaining and exploiting associated cost or quality or time data of the at least one information source.

23. The Method of claim 6, or 10, further comprising generating a unique sequence per processor, of strategies, parameters, and pseudorandom choices, for providing deterministic results.

24. The Method of claim 6 or 10, further comprising transforming ranges of data from the at least one sample set to ranges of variables used in the one or more methods for inferring a model by successive application of one or more transformations selected from the group consisting of:
    instantiation as a constant, reduction in range, mapping to a different range via numeric transformation, or mapping to a different categorical range, mapping from a categorical variable range to an integer, mapping from an integer range into multiple binary ranges, mapping from a continuous numeric variable into discrete ranges, mapping from discrete ranges into categorical variables, normalizing, logarithmic transformation, rounding to some number of fractional digits, rounding to some number of significant figures, linear transformations, polynomial transformations, and rational transformations.

25. The Method of claim 6, further comprising using data transformations on the sample sets so that the one or more model inference methods which could not be applied for such data can be applied to the transformed data.

26. The Method of claim 25, wherein the sample set is comprised of one or more records in which one or more values in the one or more records is drawn from at least one source other than the available data.

27. The Method of claim 26, wherein at least one source other than the available data is a generator of random values, from a specified range, given a specified distribution.

28. The Method of claim 6, further comprising generating tables and structures for building executable instantiations of the models.

29. The Method of claim 6, further comprising generating tables and structures for building one or more executable instantiations running on multiple processors.

30. The Method of claim 6, further comprising approximating the relationship between one or more performance criteria and model inference method parameter choices.

31. In a computer system having at least one processor, at least one memory unit, an input device and an output device, a method for constructing computer representations of new knowledge of physical phenomena or of commercially significant phenomena in the form of supported hypotheses stored in computer memory from data and for providing the computer representations of supported hypotheses for making predictions or for revealing previously unknown data relationships and for use by a human or use by a computer acting on behalf of one or more humans wherein the use is as a basis for decision-making, comprising the steps of:
 a) encoding least one model in terms of at least one variable;
 b) associating the variable with at least one class of items;
 c) encoding a plurality of hypotheses as variations to the at least one model, wherein the range of the at least one variable is transformed to a different range;
 d) associating the at least one variable of the at least one model with at least one information source; and
 e) selecting at least one tuple from the information source, along with corresponding model outputs for using as evidence that supports or refutes the hypotheses.

32. The method of claim 31, further comprising automatically generating and improving new hypotheses, by using class membership or other relations associated with the variables to select transformations.

33. The method of claim 32 wherein the range of the at least one variable is transformed by successive application of one or more methods selected from the group consisting of:
 instantiation as a constant, reduction in range, mapping to a different range by numeric transformation, mapping to a different categorical range, mapping from a categorical variable range to an integer, mapping from an integer range into multiple binary ranges, mapping from a continuous numeric variable into discrete ranges, mapping from discrete ranges into categorical variables, normalizing, logarithmic transformation, rounding to some number of fractional digits, rounding to some number of significant figures, linear transformations, polynomial transformations, and rational transformations.

34. The Method of claim 33, further comprising creating a conceptual organization of the at least one model, via the steps of:
 a) representing the model by at least one organization of arcs and nodes selected from the group consisting of:
  a tree, polytree, arbor, directed acyclic graph, specialized network, and general unrestricted network;
 wherein the conceptual organization organizes at least two nodes and an arc, with labels of nodes or arcs selected from the group consisting of:
  relationships, variables, causes, intentions, beliefs, aims, behaviors, and reifications of the nodes or arcs.

35. The Method of 34, further comprising creating a description of the at least one model, by restricting at least one distinguished parameter or at least one distinguished variable by at least one label selected from the group consisting of: inputs, outputs, belief calculus, provenance rules, cost and range of applicability, credibility, ownership, and access authorization;
 wherein belief calculus is any system for ascribing the degree of a belief in the outputs of the at least one represented model as a function of the degree of belief in the values of at least one parameter or at least one variable of the model.

36. The Method of 35, further comprising improving the efficiency or explanatory power of the conceptual organization of the at least one represented model by repeating the steps of:
 a) creating a mapping between the parameter or variable of the model and information source;
 b) adding at least one new model;
 c) re-organizing some or all of the existing conceptual organization.

37. The Method of claim 36, further comprising using the encoded hypothesis for selecting more models for which the hypothesis is a variation.

38. The Method of claim 37, further comprising using succession of queries for incrementally extending the conceptual organization of the at least one model.

39. The Method of 35, wherein the belief calculus is at least one method selected from the group consisting of:
 Bayesian belief networks, Dempster-Schafer evidence models, fuzzy logic, non-axiomatic reasoning methods, transferable belief models, Bonissone's real-time system for reasoning with uncertainty, certainty factor systems, statistical reasoning, Lowrance's evidential intervals, causal networks, non-monotonic logic, truth maintenance systems, and logic-based abduction.

40. The Method of claim 32, further comprising the step of using at least one machine-learning method selected from the group consisting of:
 AdaBoost, agglomerative nesting, all-dimensions-tree approaches, the Apriori algorithm, arcing, artificial neural networks, auto-regressive integrated moving averages, bagging, Bayesian analysis clustering, Bayesian influence networks, boosting, C4.5, C5.0, Chi-square automatic interaction detection, clustering by expectation, competitive learning, constrained association rule approaches, density-based clustering, deviation-based outlier detection, distance-based outlier detection, divisive analysis, dynamic time-warping methods, error minimization via robust optimization, exponential smoothing, farthest-first techniques, fast Fourier transform, frequent-pattern tree approaches, generalization-tree approaches, generalized autoregressive conditional heteroskedastic methods, hidden-Markov models, hierarchical learning, hypergraph partitioning algorithms, ID3, incremental conceptual clustering, inductive logic programming, inferred rules, Kalman filtering, kernel methods, k-means clustering, k-medoids clustering, latent semantic indexing, linear regression, Logit regression, multi-resolution grid clustering, non-linear regression, one-R, Peano count tree approaches, prefix-projected sequential pattern mining, principal component analysis, Probit regression, radial basis functions, regression tree approaches, reinforcement learning, robust clustering using links, rough-set classifiers, Self-organizing maps, stacking, support vector machines, the direct hashing and pruning algorithm, the dynamic itemset counting algorithm, time-series learning, unsupervised learning, vertical itemset partitioning algorithms, vertical-layout algorithms, Voronoi diagrams, wagging, wavelets, and zero-R;

and using an encoding of at least one relation between at least two variables as a statement in predicate logic, for learning the mapping between at least one at least one tuple from the information source and the at least one statement in predicate logic.

41. The Method of claim 40, further comprising the step of using a simulation as an information source to for learning the mapping between the simulation's behavior and the at least one statement in predicate logic.

42. The Method of claim 40, further comprising the step of using a graph as an information source for learning the mapping between the graph's structure and the at least one statement in predicate logic.

43. The Method of claim 40, further comprising the step of using image data as an information source for learning the mapping between the image contents and the at least one statement in predicate logic.

44. The Method of claim 40, further comprising the step of using image data as an information source for learning the mapping between the image contents and the at least one statement in predicate logic.

45. The Method of claim 40, further comprising the step of using data from numerical experiments, and at least one statement in predicate logic pertaining to algebraic relationships for learning the mapping between variables of the numerical experiments and the at least one statement in predicate logic pertaining to algebraic relationships.

46. The Method of claim 40, further comprising the step of continuously or periodically re-organizing some or all of the conceptual organization of the at least one represented model by one or more criteria selected from the group consisting of:
minimum description length, rules constructed by expert taxonomists and curators, frequency of use, frequency of association, maximum compliance with standard ontologies, maximum compliance with industry or military standard terminology or specifications, minimum average access time, minimum worst case access time, minimum storage requirements, and some utility function.

47. The Method of claim 46, further least one conceptual organization of the at least one model with at least one educational or tutorial resource.

48. The Method of claim 46, further associating the at least one conceptual organization of the at least one model with at least one supplier of commercial or non-commercial goods or services.

49. The Method of claim 46, further comprising providing a means of collaboration by network of models, spanning multiple domains of knowledge.

50. The Method of claim 49, wherein the at least one model represents engineering relationships, or represents proposed manufactured products, or represents at least one manufacturing processes.

51. The Method of claim 46 further comprising a method of finding a distinguished conceptual area of knowledge by examining the representation of the conceptual organization of the at least one model and searching for unusual regions as measured by at least one criterion selected from the group consisting of:
sparseness of nodes or links, uncertainty associated with nodes or links, and duplication of node or links.

52. The Method of claim 46 further comprising adding a user interface, allowing navigation of existing model relationships and construction and addition of at least one new model, and facilitating visualization of at the least one model in relation to at least one other model for acquiring, representing, developing, organizing, and presenting knowledge.

53. The Method of claim 52, further comprising a system for acquiring, representing, developing, organizing, and presenting knowledge about biology and medicine by encoding fundamental knowledge about biology and medicine in the at least one model and the least one organization of nodes.

54. The Method of claim 52, further comprising a system for acquiring, representing, developing, organizing, and presenting knowledge about drug therapies and drug targets by encoding the at least one model and the least one organization of nodes with fundamental knowledge about the affects of drugs on disease, on the causes of disease, and on organisms.

55. The Method of claim 52, further comprising a system for acquiring, representing, developing, organizing, and presenting knowledge about strategies for directed evolution by encoding the at least one model and the least one organization of nodes with fundamental knowledge about the affects of various mutations on organism phenotypes.

56. The Method of claim 52, further comprising a system for acquiring, representing, developing, organizing, and presenting knowledge about the mechanisms and consequences of genetic diversity in living systems by encoding the at least one model and the least one organization of nodes with fundamental knowledge about demes, populations, mutation, genetic drift, viability, and speciation.

57. The Method of claim 52, further comprising a system for acquiring, representing, developing, organizing, and presenting knowledge about a language by encoding the at least one model and the least one organization of nodes with fundamental knowledge about words, meanings and syntax.

58. The Method of claim 52, further comprising a system for acquiring, representing, developing, organizing, and presenting knowledge about the likely goals of at least one entity by encoding the at least one model and the least one organization of nodes with fundamental knowledge about goals, strategies, and beliefs of intelligent entities.

59. The Method of claim 52, further comprising a system for acquiring, representing, developing, organizing, and presenting knowledge about the confidential plans or activities of the at least one entity by encoding the at least one model and the least one organization of nodes with fundamental knowledge about at least one entity selected from the group consisting of: individuals, corporations, governments, and other organizations, along with methods of deception, methods of obscuration, and constraints on action.

* * * * *